(12) United States Patent
Yamane et al.

(10) Patent No.: US 6,338,237 B1
(45) Date of Patent: *Jan. 15, 2002

(54) PORTABLE REAPER

(75) Inventors: Yoshiro Yamane, Akashi; Kazuhiko Takemoto; Tadao Yashirodai, both of Kakogawa, all of (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/547,688

(22) Filed: Apr. 12, 2000

(30) Foreign Application Priority Data

Apr. 26, 1999 (JP) .............................. 11-118591

(51) Int. Cl.$^7$ .............................................. A01D 46/00
(52) U.S. Cl. .......................................... 56/328.1; 56/296
(58) Field of Search ................................ D8/8; 56/127, 56/11.2, 11.3, DIG. 20, 328.1, 296; 30/263, 264, 276, 347, DIG. 5

(56) References Cited

U.S. PATENT DOCUMENTS

| 3,990,523 A | * | 11/1976 | Schramm et al. | ............ | 173/162 |
| 4,078,516 A | * | 3/1978 | Balius | ........................ | 115/42 |
| 4,290,202 A | * | 9/1981 | Nadenoff | ..................... | 30/382 |
| 4,987,732 A | * | 1/1991 | Terai et al. | ................... | 56/255 |
| 5,205,711 A | * | 4/1993 | Raczykowski | ............... | 416/63 |
| D427,862 S | * | 7/2000 | Yamane et al. | ................. | D8/8 |

FOREIGN PATENT DOCUMENTS

JP        HEI 7-164351        6/1995

* cited by examiner

Primary Examiner—Robert E. Pezzuto
(74) Attorney, Agent, or Firm—Oppenheimer Wolff & Donnelly LLP

(57) ABSTRACT

It is an object to provide a power driven portable reaper comprising a guard structure for guarding the portable reaper when the portable reaper is to be temporarily put on the ground or during a reaping work. A power driven portable reaper (A) comprises an engine (20) on a base end thereof, a rod member (22) which is elongated forward from a tip side of the engine(20), an impact force generating unit (24) for converting rotation into reciprocation, and a cutting blade (26) provided in a tipmost portion thereof, a plurality of pipes (1A, 1B, 1C) are provided around the engine (20) so as to surround an outer circumference of the engine (20) in a direction from a tip of the engine (20) to a base end of the engine (20). A guard member is provided to be protruding outward from the reaper in the vicinity of the input force generating unit.

10 Claims, 8 Drawing Sheets

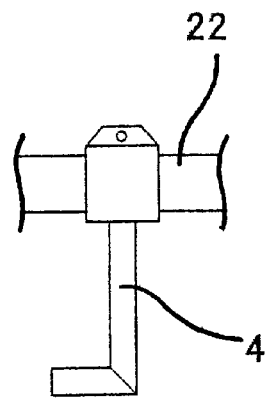
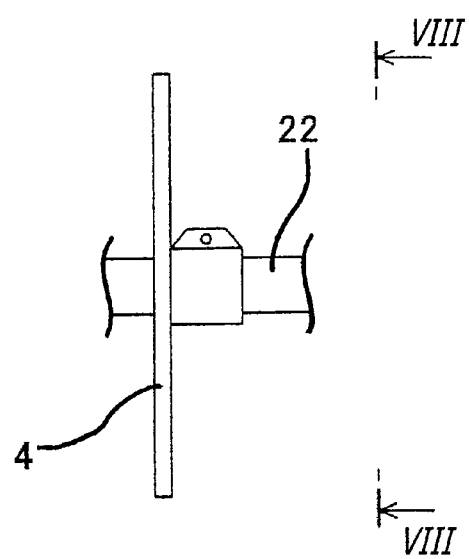
FIG. 8A   FIG. 8B
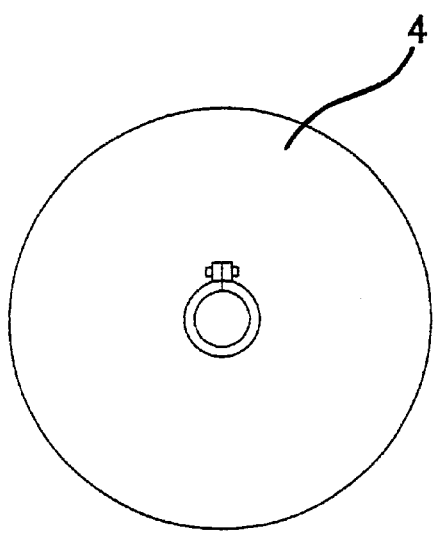
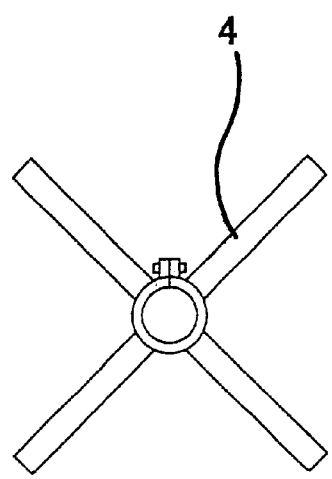
FIG. 8C   FIG. 8D

PORTABLE REAPER

BACKGROUND OF THE INVENTION

1. Field of the Invention

The invention relates to a power driven portable reaper for cutting fruit off of trees to reap such fruit and to cut branches, leaves and the like of trees on the ground, and more particularly, to a throttle lever equipment of a power driven portable reaper suitable for reaping the fruit of an oil palm.

2. Description of the Related Art

The fruits of an oil palm, which are a kind of nut, are produced on the tree of the oil palm which has a height of 2 to 3.5 meters from the ground. Conventionally, the fruits have been reaped from the tree by using a reaping hand tool including a flat chisel type cutting blade on a tip thereof and having a pole formed of solid or hollow pipe attached to a rear end thereof so as to press the cutting blade forward against the root of the fruit of the palm. In the above-mentioned reaping work, however, the strong fiber of the palm extending in a direction orthogonal to the should be cut off. Therefore, it is necessary to carry out an operation for causing the cutting blade to move forward many times to penetrate the root of the fruit, or the like. In addition, since the reaping tool is heavy, the reaping work requires great physical strength.

In consideration of such circumstances, the applicant has tried to provide a power driven portable reaper in which a cutting blade is reciprocated in a longitudinal direction by the power of an internal combustion engine or the like (see Japanese Laid-Open Patent Publication No. Hei 7-164351 as the related art).

Based on the situation in the Southeast Asia, for example, where the oil palm is grown, an optimum portable power driven reaper has been developed to solve problems encountered while using reapers in the actual reaping of fruits. In this case, it has been found that a proper guard mechanism for protecting the portable reaper is required because of working conditions and working places.

SUMMARY OF THE INVENTION

In consideration of such circumstances, it is an object of the invention to provide a power driven portable reaper comprising a guard structure for guarding the reaper when the reaper is to be temporarily put on the ground or during a reaping work.

The first aspect of the invention provides a power driven portable reaper comprising a power unit provided on a base end, an elongated rod member provided on a tip of the power unit, an impact force generating unit for converting rotation into reciprocation, a cutting blade provided in a tipmost portion, and a guard structure constituted by a plurality of pipes around the power unit so as to surround an outer circumference of the power unit from a tip of the power unit to a base end thereof in the longitudinal direction of the reaper.

According to the portable reaper having such a structure, the power unit is guarded to be wholly covered by the guard structure comprising a plurality of pipes. Therefore, also in the case where the portable reaper which is comparatively heavy collides with something or the ground, the power unit can effectively be protected.

Moreover, the guard structure is constituted by arranging a plurality of pipes around the power unit so as to surround the power unit in a direction from the tip to the base end in the longitudinal direction, and so the guard structure becomes strong and light.

In the portable reaper, if the guard structure further comprises a bar-shaped member protruded rearward from the base end of the power unit, the bar-shaped member can be utilized as an extension grip of the portable reaper and the portable reaper can be held such that the elongated rod member of the reaper can be erected on the ground in the configuration in which the weight of the reaper or a certain shocking force does not directly act on the power unit from the ground. Also in the case where the ground is muddy, the power unit can be erected upward apart from the muddy ground.

In the portable reaper, if the guard structure is constituted by three pipes, that is, two pipes provided below the power unit and one pipe provided above the power unit in a state in which the rod member of the reaper is held horizontally, the portable reaper can be stably put on the ground by the two lower pipes when the rod member is to be put in parallel with the ground. Moreover, the upper pipe can be used as a grip to be gripped when the portable reaper is to be lifted or carried.

Furthermore, the second aspect of the invention provides a power driven portable reaper comprising a power unit provided on a base end portion, an elongated rod member provided on a tip of the power unit, an impact force generating unit for converting rotation into reciprocation, a cutting blade provided in a tipmost portion and wherein a guard member is provided to be protruded outward from at least the impact force generating unit in the vicinity of the impact force generating unit in a direction which is substantially orthogonal to a longitudinal direction of the portable reaper.

According to the portable reaper having such a structure, the fruits or leaves of a palm can be prevented from falling down to collide with the portable reaper, and furthermore, a operator can be protected.

Moreover, in the case where the fruits of the palm which have been cut off stay between the leaves of the palm, the reaper can be advantageously used to hook and drop the fruits of the palm.

In the portable reaper, if a tip portion of the guard member is bent forward at about 90 degrees, it is possible to effectively cause the leaves of the palm to be caught or deflected when falling down after being cut off a tree.

These objects as well as other objects, features and advantages of the invention will become more apparent to those skilled in the art from the following description with reference to the accompanying drawings.

BRIEF DESCRIPTION OF THE DRAWINGS

FIG. 8 is a view showing additional exemplary guard members according to various alternative embodiments of the second aspect of the invention, FIGS. 8A, 8B and 8D being enlarged views showing such further embodiments respectively and FIG. 8C being a view taken along the line VIII—VIII in FIG. 8B.

DETAILED DESCRIPTION OF THE PREFERRED EMBODIMENT

Figure 1:
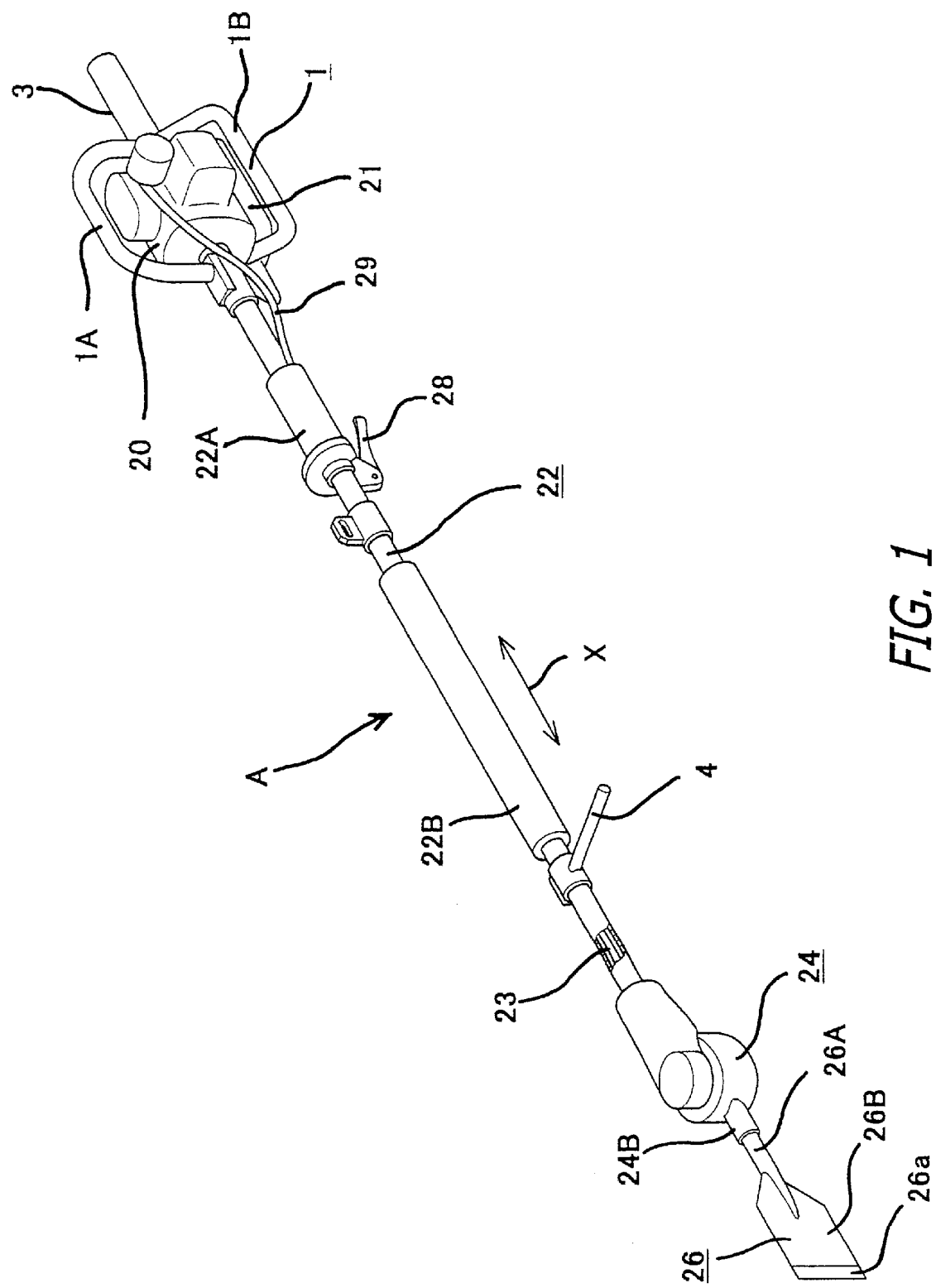
FIG. 1 is a perspective schematic view showing an exemplary embodiment of structure of a power driven portable reaper, a part of which is cut away.

A power driven portable reaper according to an embodiment of the invention will be more specifically described below with reference to the drawings.

First of all, the basic structure of the power driven portable reaper will be described with reference to FIG. 1. The power driven portable reaper A comprises an internal combustion engine 20 as a power unit, a elongated rod member 22, an impact force generating unit 24, a cutting blade 26, and a fuel tank 21 positioned under the engine 20.

While the power unit is constituted by the engine 20 in the embodiment, it may be constituted by an electric motor or the like. In the embodiment, the engine 20 is formed of a single-cylinder 2-cycle engine and generates rotating force.

The rod member 22 connects the engine 20 to the impact force generating unit 24. The rod member 22 is constituted by a hollow pipe which a drive shaft 23 for driving power (rotating force in the embodiment) penetrates. Accordingly, the rotating force generated by the engine 20 is transmitted to the impact force generating unit 24 by the drive shaft 23. The rod member 22 has a proper length, more specifically, a length of about 2.5 meter in the embodiment in such a manner that a cutting blade 26 provided on a tip of the reaper can reach the fruits of a palm.

The impact force generating unit 24 comprises an eccentric cam mechanism which is not shown and serves to convert the rotating force of the engine 20 into continuous striking force (impact force) in a reciprocating direction coincident with the longitudinal direction of the portable reaper A (see a direction of an arrow X in FIG. 1).

The cutting blade 26 is formed to have the shape of a flat chisel by welding a plate-shaped blade member 26B to a shank member 26A such that a blade is turned forward. The shank member 26A is inserted and fixed into a hole (not shown) of a cutting blade attaching portion 24B of the impact force generating unit 24 which is opened toward the tip. The shank member 26A is inserted and fixed to the hole of the cutting blade attaching portion 24B such that it can be reciprocated in the longitudinal direction of the portable reaper A by a predetermined stroke amount. More specifically, the rear end face of the shank member 26A is periodically struck by the striking force generated by the impact force generating unit 24.

Moreover, the rod member 22 of the portable reaper A is provided with a first grip portion 22A positioned on a base end side and a second grip portion 22B which is positioned apart from the first grip portion 22A toward the tip side. An operation lever (a throttle lever) 28 is attached adjacently to the first grip portion 22A. The operation lever 28 is connected to a throttle of a carburetor of the engine 20 through a throttle cable 29 and can control the speed of rotation of the engine 20 to be set desirably and properly from an idling state. The engine 20 is coupled to the drive shaft 23 penetrating the rod member 22 through a centrifugal clutch. Accordingly, when the operation lever 28 is released, the engine 20 is brought into the idling state by a return spring(not shown).

And, the centrifugal clutch is brought into a "disconnection" state. For this reason, the rotating force of the engine 20 is not transmitted to the impact force generating unit 24. On the other hand, when the operation lever 28 is gradually depressed against the urging of the return spring, the speed of rotation of the engine 20 is gradually increased according to the operating amount. When a predetermined speed of rotation is obtained, the centrifugal clutch is connected. Consequently, the impact force generating unit 24 starts periodic striking the shank member 26A of the cutting blade 26. Furthermore, when the operating amount of the operation lever 28 is further increased, the speed of rotation of the engine 20 is further increased so that a striking cycle is shorten, that is, striking is performed with a high frequency.

Figure 9:
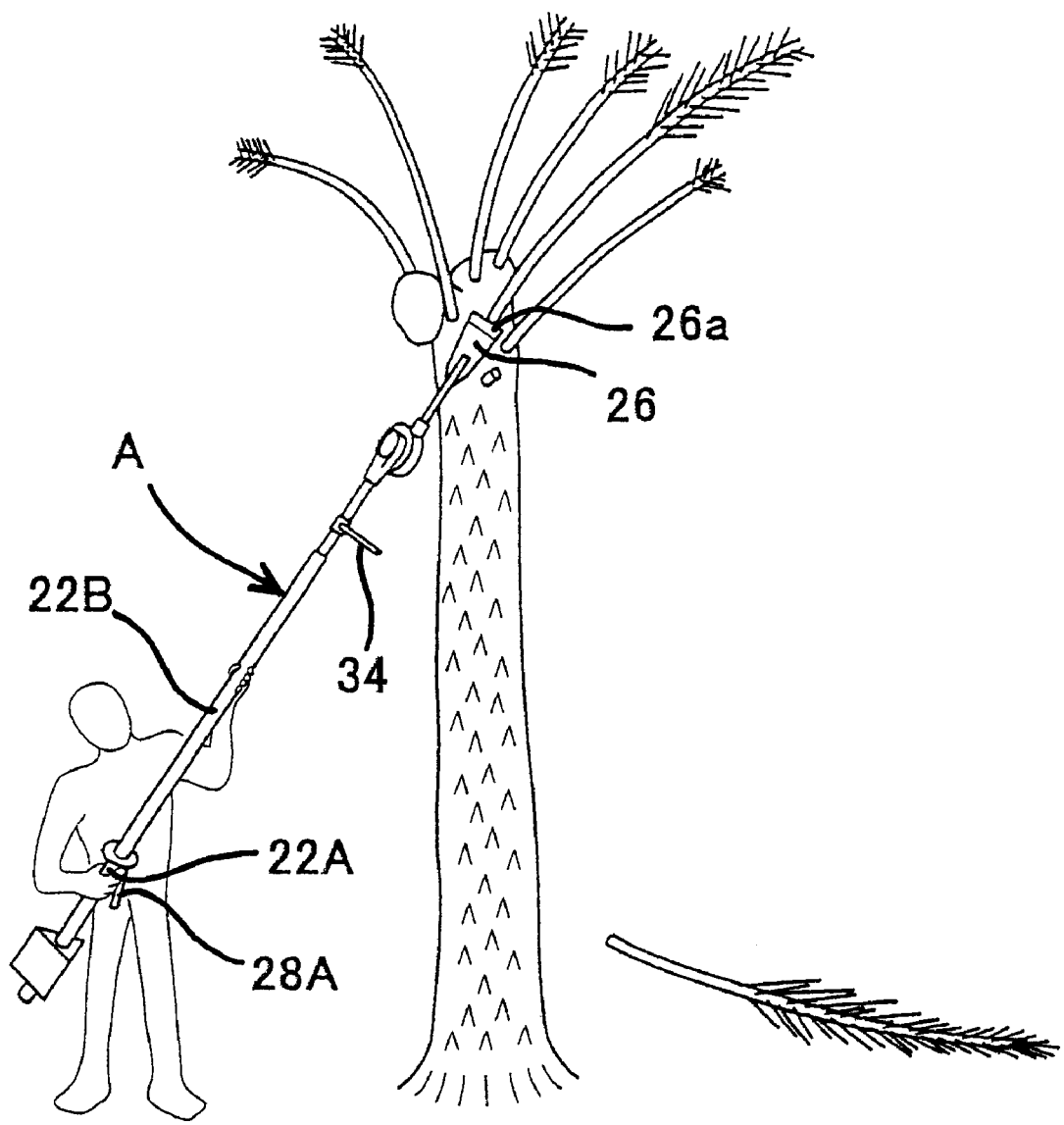
FIG. 9 is a perspective view showing a state in which the fruits of an oil palm are cut off by using the portable reaper according to the invention.

Next, a method for using the portable reaper A will be described with reference to FIG. 9. FIG. 9 shows a state in which the fruits and leaves of an oil palm are cut off by means of the portable reaper A.

An operator supports the portable reaper A with one hand taking the first grip portion 22A of the portable reaper A and the other hand taking the second grip portion 22B of the portable reaper A. The hand taking the first grip portion 22A operates the operation lever 28 with a finger (for example, an index finger). As shown in FIG. 9, the operation lever 28 is operated to adjust a striking state (a striking cycle) while pushing a tip 26a of the cutting blade 26 against the core portions of the leaves and the base portions of the fruits in the oil palm. Thus, the fruits and the leaves are cut off by the striking force(the impact force).

As shown in FIGS. 1 to 4, the engine 20 of the portable reaper A is surrounded by three pipes 1 (1A, 1B and 1C), extended from a tip end 20a toward a base end 20b of the engine 20, which constitute a guard structure.

Figure 2:
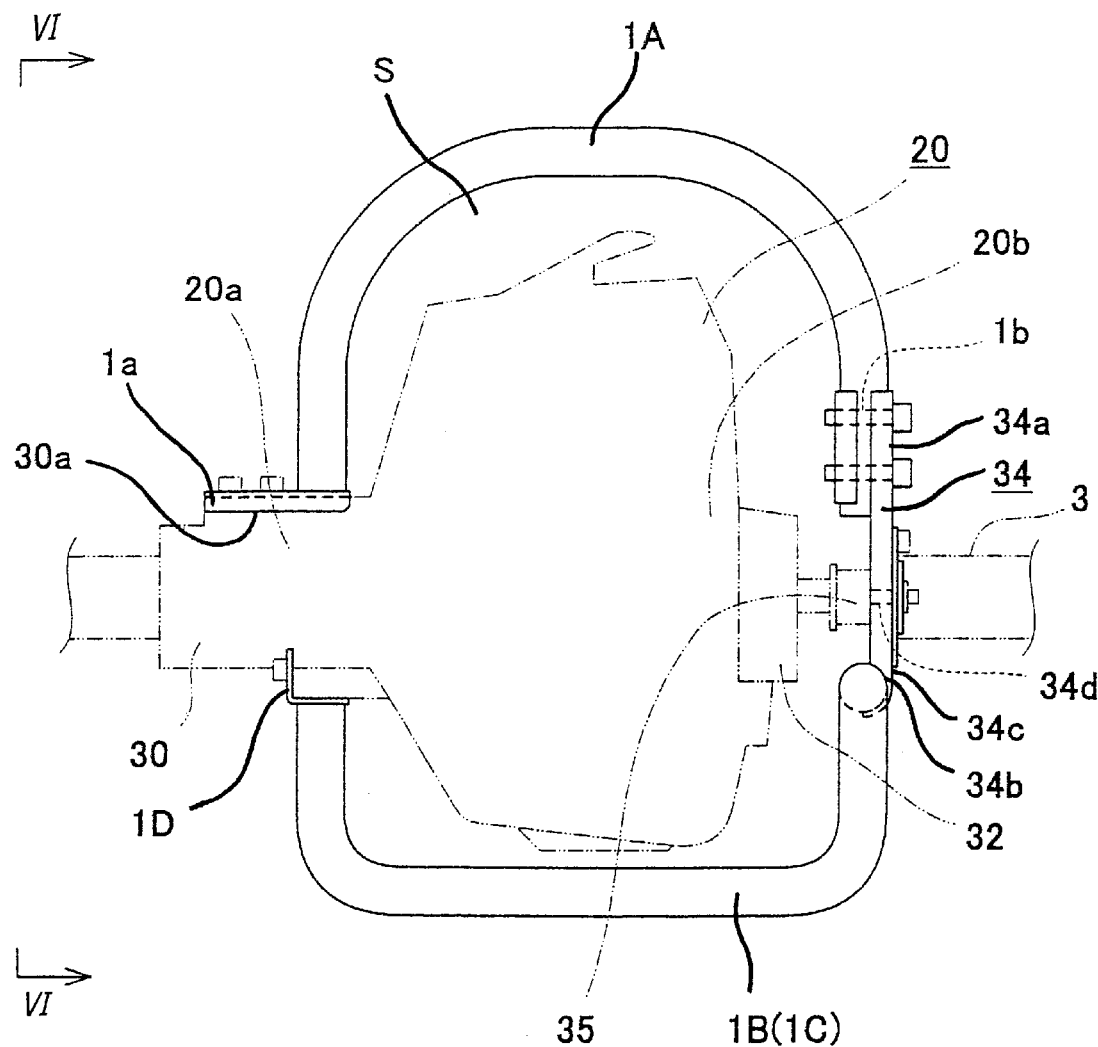
FIG. 2 is an enlarged side view showing an exemplary embodiment of guard structure for an engine of the power driven portable reaper illustrated in FIG. 1.
Figure 3:
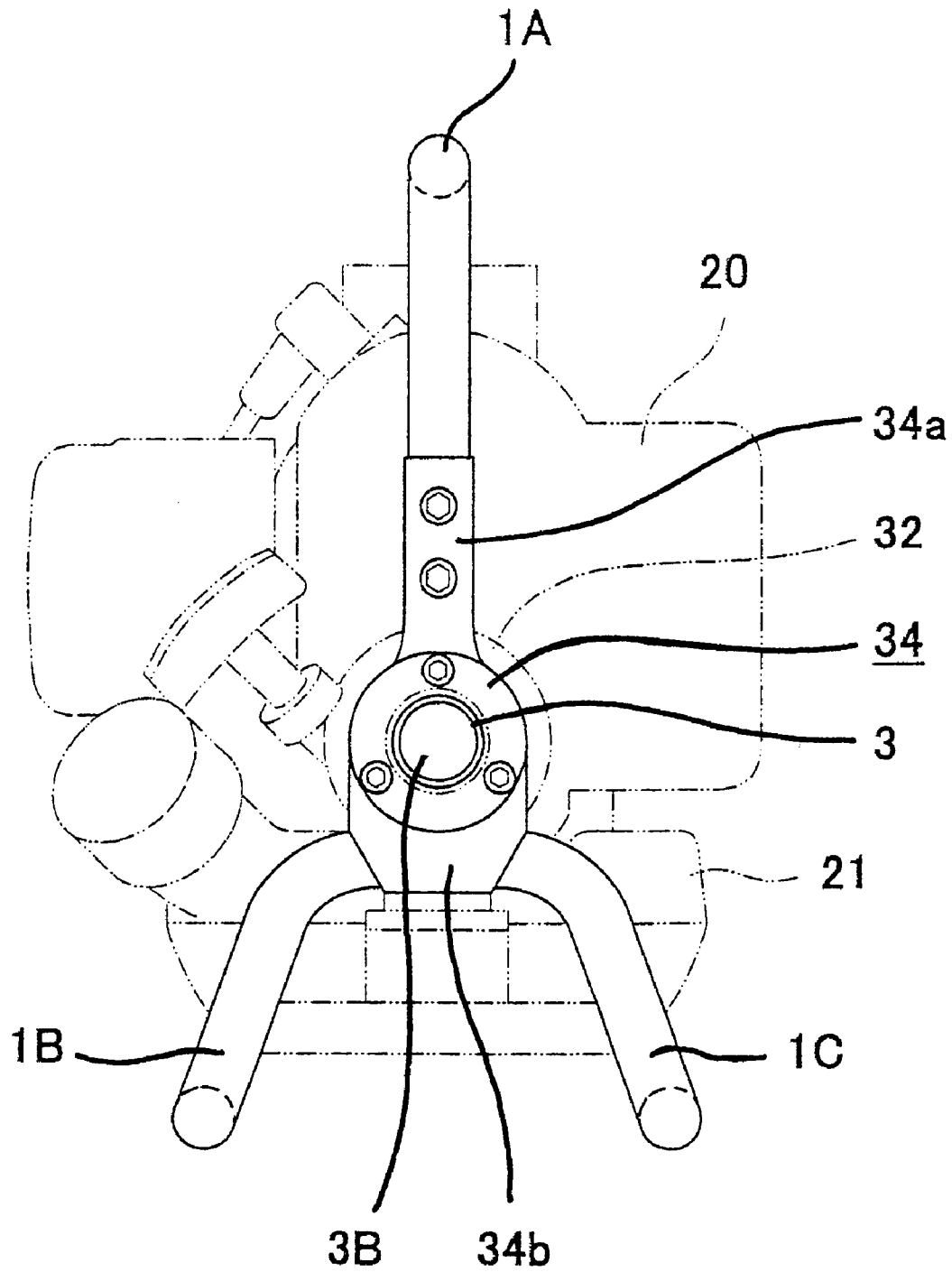
FIG. 3 is an enlarged rear view showing the guard structure for the engine of the portable reaper illustrated in FIG. 1.
Figure 4:
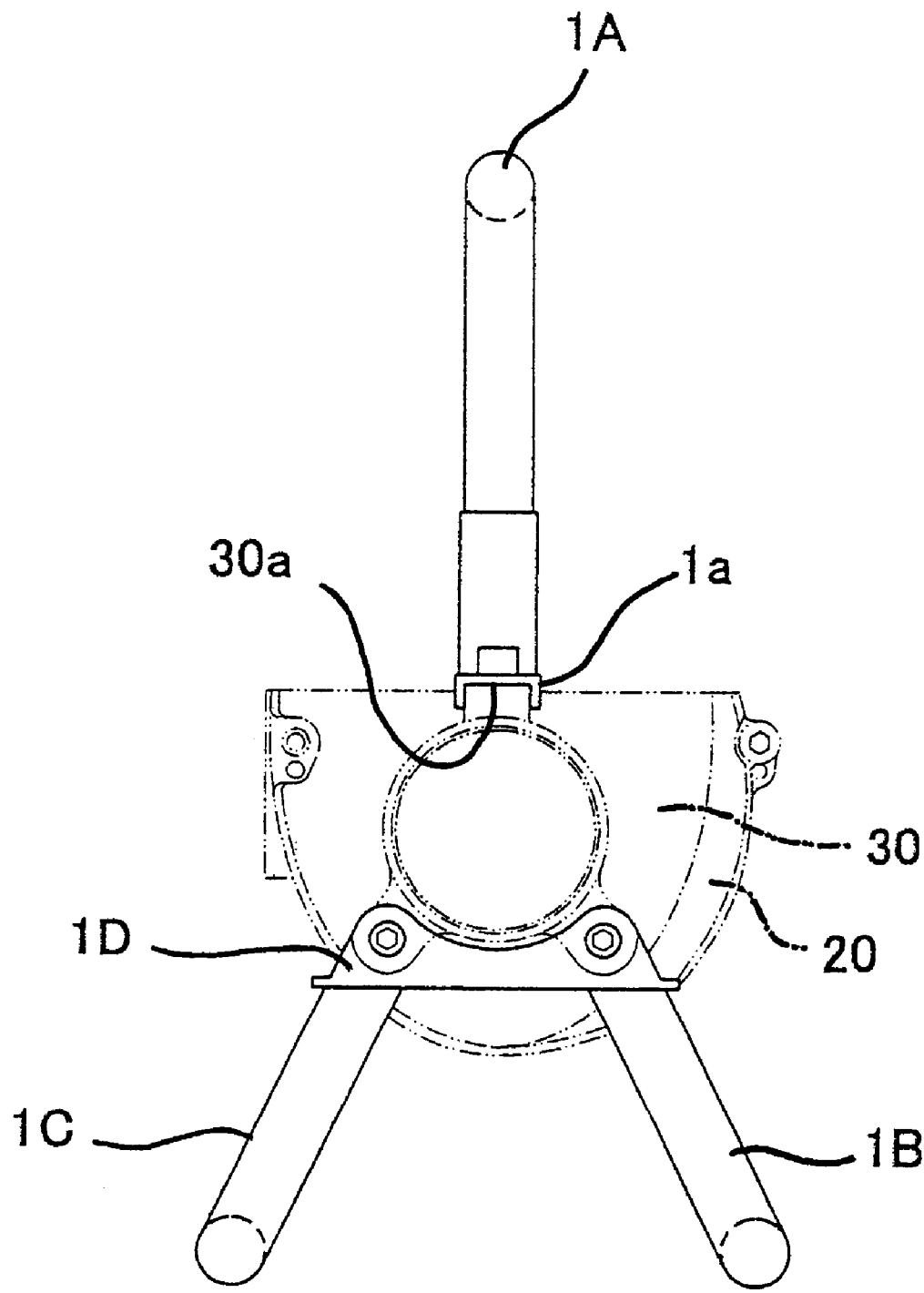
FIG. 4 is a view taken along the line IV—IV in FIG. 2 which shows the guard structure covering the engine of the power driven portable reaper illustrated in FIG. 1, a part of the engine being omitted.

More specifically, the three pipes (1A, 1B and 1C) are extended from a connecting portion of a cast forming clutch case 30 made of casting, which is arranged in a portion of the rod member 22 side of the engine 20, to a portion behind a recoil case 32 for starting, which is arranged in a portion of the base end side of the engine 20. And ends of the three pipes (1A, 1B and 1C) are coupled to a fixture 34 at the portion behind a recoil case 32. As shown in FIG. 2, the first pipe 1A is provided like an inverted U-shape to guard the upper portion of the engine 20, and the second and third pipes 1B and 1C are provided like a U-shape to guard the lower right and left portions of the engine 20. In other words, the second and third pipes 1B and 1C provided below the engine 20 are almost a vertical-shape such that the portable reaper A is supported in the lower portions as shown in FIGS. 3 and 4. Moreover, the upper pipe 1A is provided with a clearance to form a space S together with the engine 20 and passes through the center of width of the engine 20. The space S (see FIG. 2) can further form a clearance between the operator's hand griping the pipe 1A and the engine 20.

As shown in FIGS. 2 and 4, the pipe 1A has an attaching portion 1a formed on a tip thereof and the attaching portion 1a is screwed against an outer peripheral face 30a of the clutch case 30. As shown in FIGS. 2 and 3, moreover, an attaching hole 1b (see FIG. 2) penetrating in the longitudinal direction of the portable reaper A is formed on the rear end of the pipe 1A, and is screwed to an upward extended portion 34a of the fixture 34.

Furthermore, the rear ends of the two lower pipes 1B and 1C are welded to a lower end 34b of the fixture 34 as shown in FIGS. 2 and 3, respectively. Moreover, the tips of the pipes 1B and 1C are welded to a common attaching plate 1D and are screwed to the tip face of the clutch case 30 through the attaching plate 1D as shown in FIGS. 2 and 4.

As shown in FIGS. 2 and 3, a bar-shaped member 3 made of a pipe is extended to a base end side of the reaper from the base end face 34c of the fixture 34 on an virtual extension line of a crankshaft of the engine 20. Moreover, the base end face of the bar-shaped member 3 is blocked by a cover member 3B for preventing intruding of mud and the like.

Besides, an attaching through hole 34d is formed on the virtual extension line of the crankshaft in the fixture 34 as shown in FIG. 2, and the base end of a vibration isolating member 35 is attached to the through hole 34d. The tip of the vibration isolating member 35 is screwed to the recoil case 32.

Figure 5A:
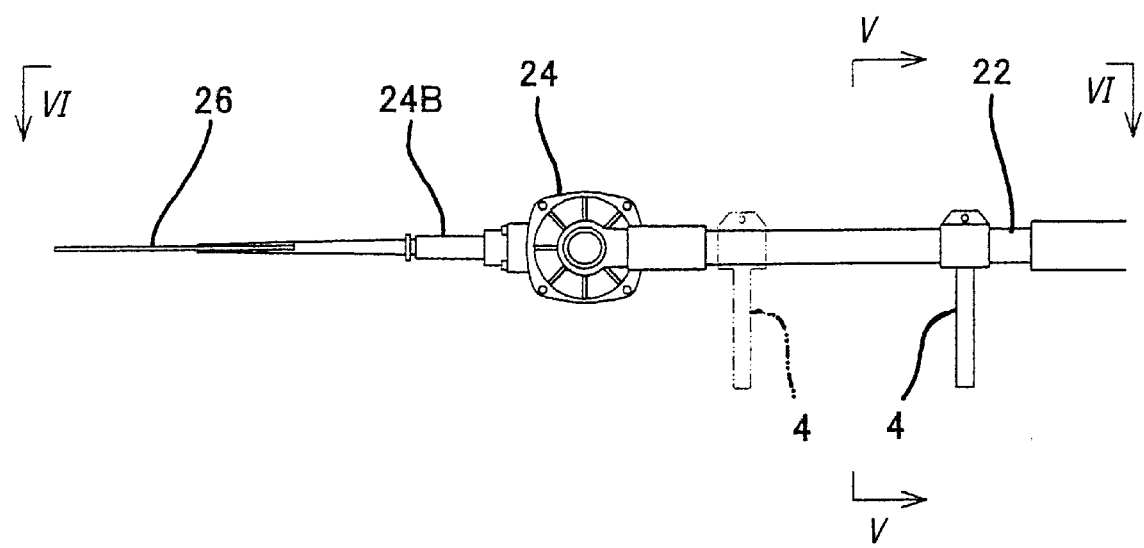
FIG. 5 is a view showing a tip portion of the power driven portable reaper in which an exemplary guard member is provided in the vicinity of an impact force generating unit, FIG. 5A being a partial side view and FIG. 5B being an enlarged view taken along the line V—V in FIG. 5A, showing a state in which the guard member illustrated in FIG. 5A is attached to a rod member.
Figure 5B:
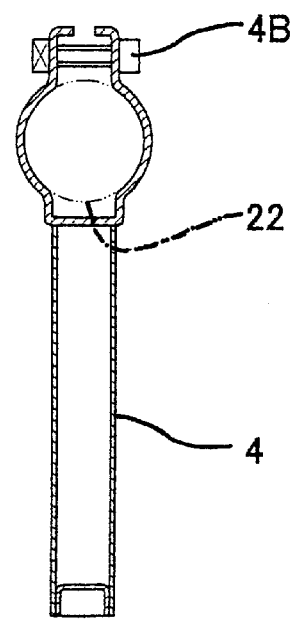
Figure 6:
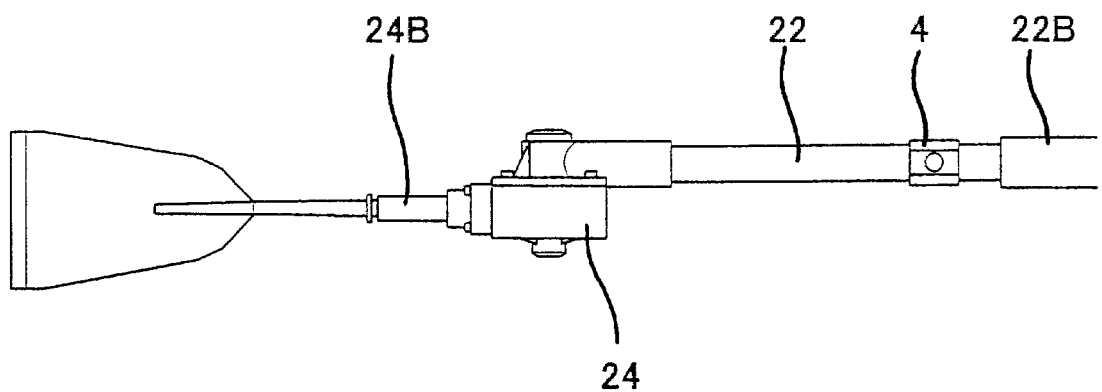
FIG. 6 is a partially enlarged plan view taken along the line VI—VI in FIG. 5A.

As shown in FIGS. 1, 5 and 6, a guard member 4 extending in a direction orthogonal to the longitudinal direction of the rod member 22 is provided in the tip portion of the rod member 22, that is, in a portion adjacent to the base end of the impact force generating unit 24. The guard member 4 is constituted such that the position thereof on the outer peripheral face of the rod member 22 can be changed in the longitudinal direction from a position shown in a solid line of FIG. 5A as illustrated in a two-dot chain line and can be secured with a screw 4B in a desired position as shown in FIG. 5B.

According to the exemplary guard structure, the engine 20 is protected by the pipes 1 (1A, 1B and 1C) and functions in the following manner with the exemplary guard member. When the portable reaper A is put on the ground with the second and third pipes 1B and 1C placed in lower portions, the center of gravity of the portable reaper A is set in the middle position of the pipes 1B and 1C. Thus, the portable reaper A can be put on the ground in a stable state. In this state, the portable reaper A can easily be lifted by holding, with a hand, the first pipe 1A positioned above the engine 20. On the other hand, since a bar-shaped member 3 is extended rearward from the fixture 34 coupled to the three pipes 1 (1A, 1B and 1C), the cutting blade 26 can be caused to reach a more distant position by utilizing the bar-shaped member 3 as an extension grip instead of the first grip portion 22A and the second grip portion 22B which are ordinary grips for supporting the portable reaper A. In this case, the three pipes 1 (1A, 1B and 1C) coupled to the bar-shaped member 3 have front ends supported by the front portion of the engine 20 directly and rear ends supported through the vibration isolating member 35. Therefore, even if the bar-shaped member 3 is held to support the portable reaper A, a great external force that might be applied to the pipe 1 or bar-shaped member 3 does not act on the engine 20. Moreover, when the portable reaper A is erected on the ground with the cutting blade 26 placed in an upper position and the engine 20 placed in a lower position for rest temporarily during work for reaping the fruits of the palm, it can be used conveniently. In this case, the bar-shaped member 3 is support for the weight of the reaper A directed toward the ground and can endure a certain shocking force. Also in this case, however, the weight of the portable reaper A and the shocking force are not directly applied to the engine 20 for the above-mentioned reasons. Accordingly, special reinforcement or the like is not required for the engine 20 and a general(not special) engine can be used. For example, while the end portion of the engine 20 according to the embodiment provides the recoil case 32, the recoil case 32 can be made of popular resin, that is, not a special resin or special material.

Furthermore, in the case where the ground is muddy, the mud should not stick to the engine 20 since the bar-shaped member 3 can hold the engine above mud on the ground when the portable reaper A is erected and held with member 3 touching the ground. Thus, the portable reaper A can be used conveniently.

When fruits of the oil palm are reaped from the tree of the oil palm as shown in FIG. 9, the leaves and fruits of the palm are cut off and dropped from high place to ground. The guard member 4 can be used to prevent the leaves and the fruits from falling down toward the engine 20 or the operator. If the above-mentioned guard member is provided on the tip side portion of the impact force generating unit 24, the impact force generating unit 24 can be guarded from the leaves and fruits of the palm that are falling down, which is not shown. In the embodiment of FIGS. 1 through 5, the guard member is of a bar configuration.

Figure 7:
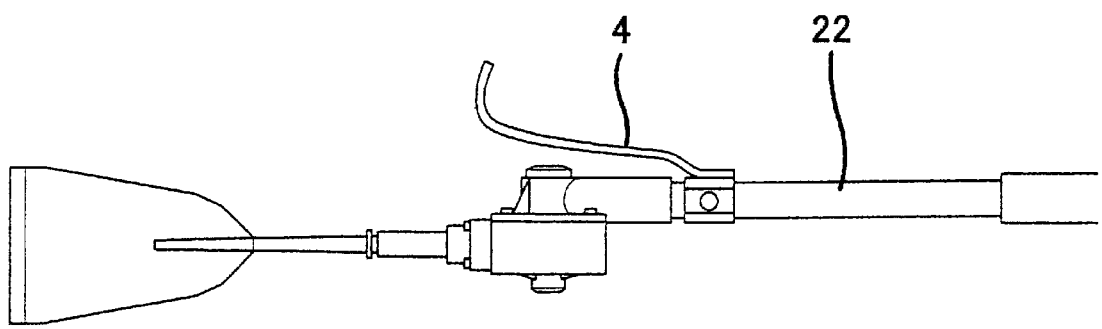
FIG. 7 is a partially enlarged plan view showing the structure of an alternative exemplary embodiment of a guard member according to another embodiment of the second aspect of the invention.

Moreover, if the guard member 4a has a hook shape which is extended toward the tip side of the reaper and is curved outward on the tip portion thereof as shown in FIGS. 6 and 7, it is possible to guard the engine 20 or the operator as well as the impact force generating unit 24 from the leaves and fruits of the palm that are falling down even if the guard member 4a is attached to the base end side of the impact force generating unit 24. Besides, the fruit of the oil palm caught between the leaves of the palm can be hooked and dropped by using the guard member 4a.

As another embodiment, if the guard member 4b is wholly constituted to take an L-shape which has a base portion extended in a direction orthogonal to the rod member 22 and a tip portion bent toward the tip side of the portable reaper from the base portion as shown in FIG. 8A, the leaves of the oil palm which fall down toward the ground can effectively be caught or deflected.

In an alternative embodiment of guard member, a disk-shaped guard member 4c may be attached to the rod member 22 as shown in FIGS. 8B and 8C.

As yet another embodiment, furthermore, it is also possible to use such a structure that the guard member 4d is formed of four bars protruding outwardly from the rod member 22 in four directions like a crisscross, that is, from the rod member 22 in the direction of an outer diameter direction like a cross seen on the tip side as shown in FIG. 8D. The structure shown in FIG. 8D or FIGS. 8B and 8C is excellent in that the leaves or fruits of the oil palm can be prevented from falling down toward the operator. Moreover the structure shown in FIG. 8D or FIGS. 8B and 8C is excellent in that the impact force generating unit 24 can be prevented from abutting against the ground when the portable reaper A is put on the dry ground by means of the pipes 1B and 1C as described above.

While the rod member 22 having a length of about 2.5 meter has been described in the above-mentioned embodiment, it is apparent that the rod member 22 may be longer or shorter according to the kinds of the palm trees having various sizes and the like.

Although the case where the fruits of the palm are solely reaped has been described in the above-mentioned embodiment, it is apparent that the reaper can be used for reaping fruits produced on other fruit trees.

Numerous modifications and alternative embodiments of the invention will be apparent to those skilled in the art in view of the foregoing description. Accordingly, this description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

What is claimed is:

1. A power driven portable reaper comprising:
   a power unit provided on a base end portion;
   an elongated rod member provided on a tip side portion of the power unit;
   an impact force generating unit for converting rotation into reciprocation;
   a cutting blade provided in a tipmost portion; and
   a guard structure constituted by a plurality of pipes mounted upon the rod member and extending around the power unit so as to surround an outer circumference of the power unit from a tip side portion of the power unit to a base end thereof in the longitudinal direction of the reaper.

2. The portable reaper according to claim 1, wherein the guard structure further comprises a bar-shaped member protruded rearward from a base end of the guard structure.

3. The portable reaper according to claim 1 or 2, wherein the guard structure is constituted by three pipes, wherein, two pipes are provided below the power unit and one pipe is provided above the power unit in a state in which the rod member is held horizontally.

4. The portable reaper according to claim 1, wherein said plurality of pipes are mounted upon the rod member via a connecting member which connects the rod member and the engine.

5. The portable reaper according to claim 4, wherein said connecting member is a clutch case.

6. A power driven portable reaper comprising:
   a power unit provided on a base end portion;
   an elongated rod member provided on a tip side portion of the power unit;
   an impact force generating unit provided in the tip portion of the rod member for converting rotation into reciprocation;
   a cutting blade provided in a tipmost portion; and
   a guard member provided to be protruding outward from the rod member of the reaper in the vicinity of the tip portion of the rod member and on the base side of the impact force generating unit in a direction which is substantially orthogonal to a longitudinal direction of the portable reaper.

7. The portable reaper according to claim 6, wherein a tip portion of the guard member is bent forward at about 90 degrees.

8. The portable reaper according to claim 6, wherein the guard member is of disk-shaped configuration.

9. The portable reaper according to claim 6, wherein the guard member is comprised of four bars protruding outwardly of the reaper in a crisscross configuration.

10. The portable reaper according to claim 6, wherein the guard member is of a hook shape which is extended toward the top side of the reaper.

* * * * *